Figure 3:
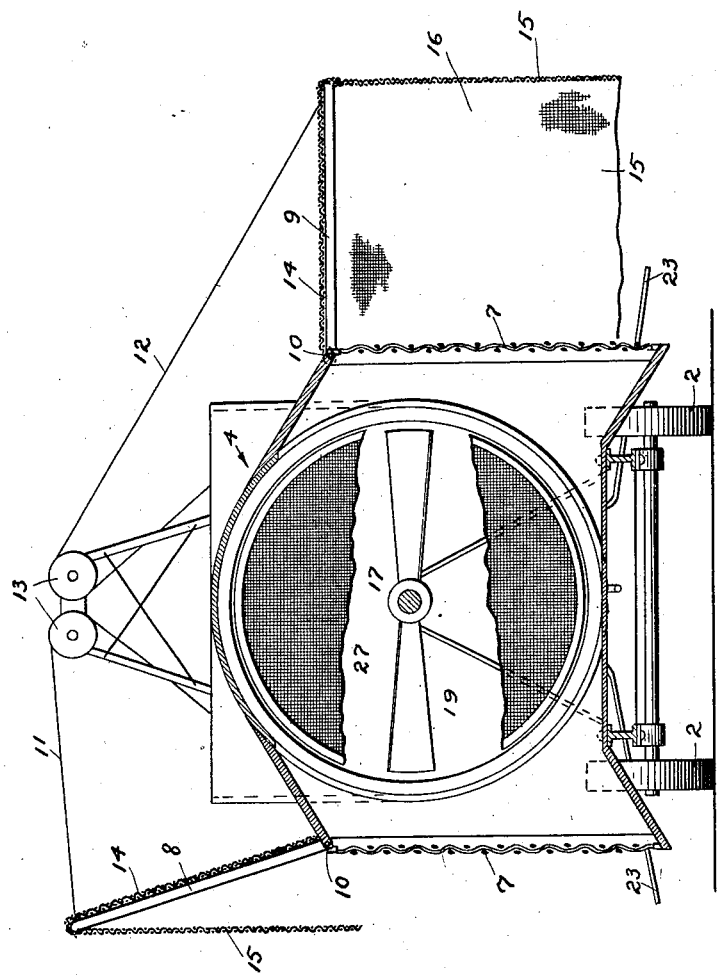

March 15, 1932. C. B. DRIVER 1,849,180
INSECT KILLING MACHINE
Filed Nov. 24, 1930 2 Sheets-Sheet 1
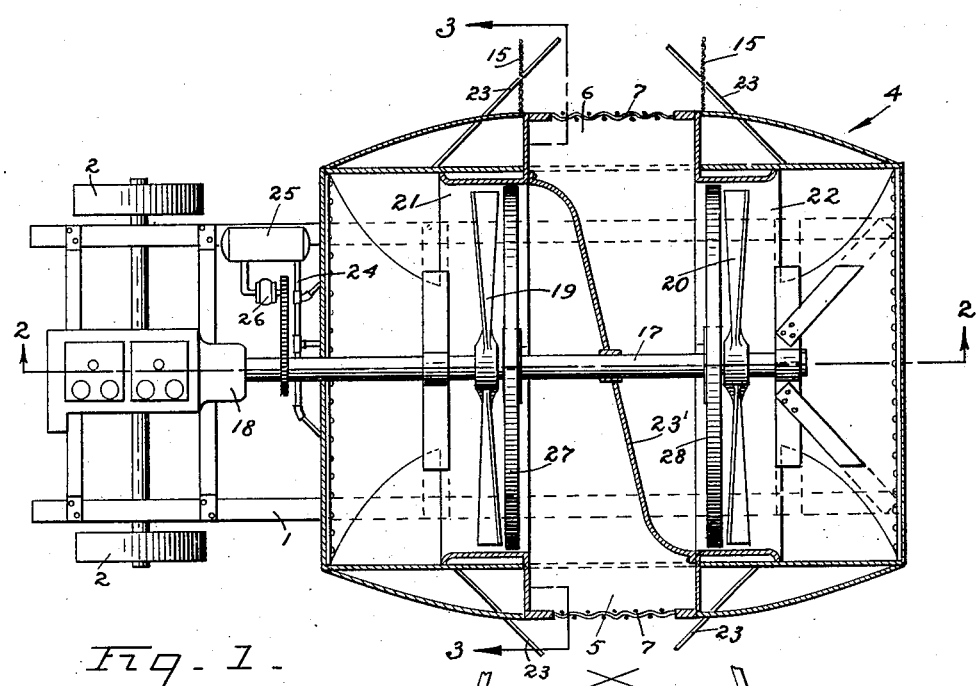
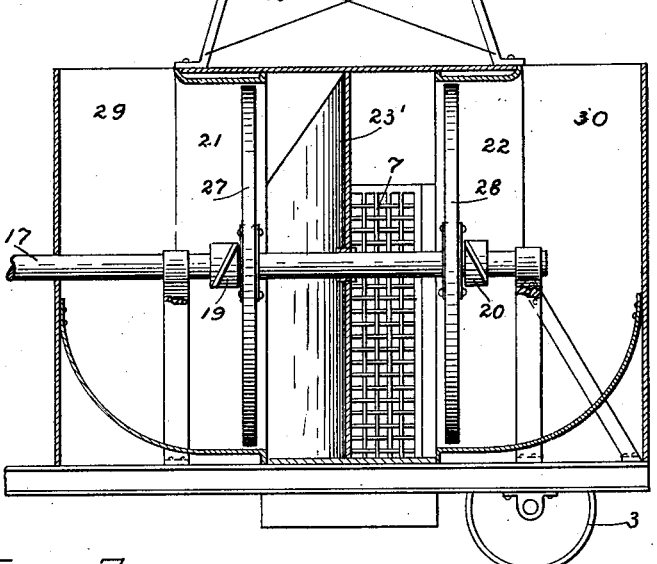
INVENTOR.
CHARLES B. DRIVER.
BY Munn & Co.
ATTORNEYS.

March 15, 1932. C. B. DRIVER 1,849,180
INSECT KILLING MACHINE
Filed Nov. 24, 1930  2 Sheets-Sheet 2

INVENTOR.
CHARLES B. DRIVER.
BY Munn + Co.
ATTORNEYS.

Patented Mar. 15, 1932

1,849,180

UNITED STATES PATENT OFFICE

CHARLES B. DRIVER, OF DINUBA, CALIFORNIA

INSECT KILLING MACHINE

Application filed November 24, 1930. Serial No. 497,913.

This invention is an improvement over my patent on a thrips catching machine No. 1,031,172 issued July 2, 1912. In the patented invention I showed a device for catching thrips and other insects and for conveying these insects to a container after killing them. In the present invention I provide a novel means for killing the insects by sucking them into a rotating screen, and after the insects are killed I blow them vertically from the device into the air instead of catching them in a container.

A further object of my invention is to provide a device of the type described in which compressed air is used for aiding in dislodging the insects from the grape vines or other plants, and in which a suction is also created for drawing the dislodged insects into the machine where they are projected against a revolving screen which kills the insects. This screen is kept clean by a sufficient flow of air therethrough to cause the insects to pass entirely through the screen and to be projected into the air.

A further object of my invention is to provide a device of the type described which is designed to be driven between adjacent rows of grape vines or the like, and which will remove insects from both rows simultaneously.

Other objects and advantages will appear as the specification proceeds, and the novel features of the device will be particularly pointed out in the claims hereto annexed.

My invention is illustrated in the accompanying drawings, in which:

Figure 1 is a horizontal section through the device, portions thereof being shown in elevation, Figure 2 is a section along the line 2—2 of Figure 1, and Figure 3 is a section along the line 3—3 of Figure 1.

In carrying out my invention I provide a carrier frame indicated generally at 1 which is supported by front wheels 2 and back wheels 3. The frame may be moved between rows of grape vines by means of horses or a tractor. The frame 1 carries a casing indicated generally at 4, and this casing has side openings 5 and 6 which are disposed near the vines. These openings may be closed by bars or heavy wire screening 7 for preventing the plants, sticks of wood and other foreign matter from being sucked into the casing 4 through the openings 5 and 6.

I provide means for temporarily housing the plants disposed opposite the openings 5 and 6, and this means consists of hinged frames 8 and 9 that are secured to the casing 4 at 10 and are designed to be raised and lowered by cables 11 and 12 that are passed over pulleys 13 and on down to an operating mechanism not shown. The frames 8 and 9 carry a canvas top 14 and canvas on three sides as at 15 forming a hood (see Figures 1 and 3). When the frames are lowered into operative position as shown by the frame 9 in Figure 3, the canvas sides 15 enclose the plants disposed opposite the opening 6, and the canvas 14 forms a top. Any suction created within the compartment 16 formed by the canvas top 14 and sides 15 will remove insects from the vines disposed within the compartment 16, and the suction created within the section 4 will draw these insects through the heavy screening 7 and on into the casing.

The means for creating a suction will now be described, and it will be noted in Figure 1 that the central shaft 17, operated by a source of power 18 such as an engine, carries propellers 19 and 20. The propeller 19 is mounted in a cylindrical housing 21, and the propeller 20 is mounted in a cylindrical housing 22. A partition 23' places the interior of the housing 21 in communication with the opening 5 and the interior of the housing 22 in communication with the opening 6. It will, therefore, be seen that a rotation of the shaft 17 will cause sufficient suction to convey insects through the screens 7 and into the housings 21 and 22. This suction is manifest in the compartments 16.

However, in order to aid the removal of the insects from the vines, I provide pipes 23 carrying compressed air and terminate these pipes adjacent to the openings 5 and 6 (see Figures 1 and 3). The pipes are connected to a common feed pipe 24 (see Figure 1) leading from a storage tank 25, and this tank is kept filled with compressed air by an air pump indicated generally at 26 which is operated by the shaft 17. The compressed air issuing from the outlet ends of the pipes 23 flows against the vines within the compartments 16 and aids in removing the insects from the vines.

The means for killing the insects comprises two circular screens 27 and 28, the screen 27 being placed in the housing 21 and the screen 28 being placed in the housing 22. These screens are carried by the shaft 17 and rotate therewith. The mesh of the screens is such as to permit the insects to be sucked therethrough by the suction created by the propellers 19 and 20, yet the rotation of the screens is at a sufficient speed to kill the insects as they are being sucked through the screens.

In Figure 2 I show how the housings 21 and 22 empty into vertically-extending outlets 29 and 30. The insects which are killed by the screens 27 and 28 are forced into the outlets 29 and 30 and are then expelled into the air. In this way the necessity for the sacking of the insects is done away with.

Although I have shown and described one embodiment of my invention, it is to be understood that the same is susceptible of various changes, and I reserve the right to employ such changes as may come within the scope of the claims hereto annexed.

I claim:

1. A traveling insect apparatus, including a suction chamber, having inlet and discharge openings, means for producing a draft through the inlet opening, a frame hinged above the inlet opening, flexible curtains dependent from said frame and forming the walls of a suction hood to direct the air draft through the foliage which harbors the insects, and discharge nozzles for compressed air for directing the air against the foliage enclosed by the suction hood.

2. In an insect killing machine, a suction chamber, means for sucking air through the chamber, and a revolving screen made of sufficiently fine mesh for killing the insects as they are drawn through the screen by the suction.

3. An insect killing machine comprising a hood for receiving foliage, means for sucking air from the hood for carrying insects therewith, and a revolving screen interposed in the stream of air made of sufficiently fine mesh for killing the insects as they are forced through the screen by the suction.

4. An insect killing machine comprising a hood for receiving foliage, means for sucking air from the hood for carrying insects therewith, a revolving screen interposed in the stream of air for killing the insects as they are forced through the screen, and a protecting screen placed between the hood and the revolving screen for preventing foliage and foreign matter from striking the revolving screen.

5. In an insect killing machine, a passageway for conveying insects, a propeller for causing air to move through the passageway at a speed sufficient to carry insects, and a revolving screen extending across the passageway made of sufficiently fine mesh for killing the insects as they are forced through the screen by the suction.

6. An insect killing machine comprising a casing having openings in its side walls, hoods having flexible sides positioned adjacent to said openings, a separate air passageway communicating with each opening, means for sucking air through the openings, and rotatable screens extending across the passageways for killing the insects, the insects being discharged from the machine by the air.

7. An insect killing machine comprising a casing having openings in its side walls, hoods having flexible sides positioned adjacent to said openings, a separate air passageway communicating with each opening, means for sucking air through the openings, rotatable screens extending across the passageways for killing the insects, the insects being discharged from the machine by the air, and means for conveying compressed air to the hoods for aiding in dislodging the insects from the foliage.

8. An insect killing machine comprising a hood for receiving foliage, means for withdrawing air from the hood for carrying insects therewith, a movable screen interposed in the stream of air made of sufficiently fine mesh for killing the insects as they are forced through the screen, and a conduit for conveying compressed air to the hood and discharging the same adjacent to the ground for aiding in dislodging the insects from the foliage.

9. An insect killing machine comprising a hood for receiving foliage, means for withdrawing air from the hood for carrying insects therewith, a movable screen interposed in the stream of air made of sufficiently fine mesh for killing the insects as they are forced through the screen, and a conduit for conveying compressed air to the hood and discharging the same adjacent to the ground for aiding in dislodging the insects from the foliage, and for directing the insects toward the hood outlet.

10. An insect killing machine comprising a casing having openings in its side walls, hoods positioned adjacent to the openings for draping over foliage, air passageways communicating with the openings, means for drawing air through the latter, rotatable screens extending across the passageways for killing insects withdrawn from foliage, and means for conveying compressed air to the hoods and discharging the same adjacent to the ground for aiding in dislodging the insects from the foliage.

Signed at Eureka in the county of Humboldt and State of California this 30 day of October, A. D. 1930.

CHARLES B. DRIVER.